US012737147B2

(12) United States Patent
Park et al.

(10) Patent No.: US 12,737,147 B2
(45) Date of Patent: Sep. 15, 2026

(54) METHOD AND SERVER FOR OUTPUTTING RECOGNITION CODE-BASED DIGITAL IMAGE CONTENT TO PLURALITY OF DISPLAY DEVICES

(71) Applicant: Plat BreAD Inc., Seoul (KR)

(72) Inventors: Dae Jun Park, Seoul (KR); Hyung Shuk Jung, Uijeongbu-si (KR); Jung Hyun Hwang, Goyang-si (KR); Myung Sung Kim, Incheon (KR); In Gyu Jang, Gwangju-si (KR)

(73) Assignee: Plat BreAD Inc., Seoul (KR)

( * ) Notice: Subject to any disclaimer, the term of this patent is extended or adjusted under 35 U.S.C. 154(b) by 121 days.

(21) Appl. No.: 18/632,103

(22) Filed: Apr. 10, 2024

(65) Prior Publication Data

US 2024/0345791 A1 Oct. 17, 2024

(30) Foreign Application Priority Data

Apr. 11, 2023 (KR) ........................ 10-2023-0047322

(51) Int. Cl.
*G06F 3/14* (2006.01)
*G06K 19/06* (2006.01)

(52) U.S. Cl.
CPC ..... *G06F 3/1423* (2013.01); *G06K 19/06037* (2013.01)

(58) Field of Classification Search
CPC ............ G06F 3/1423; G06K 19/06037; G06K 7/1417; G06Q 30/0276; G06Q 30/0212; G06Q 50/10; G09F 9/30; H04N 21/43076; H04N 21/43615
See application file for complete search history.

(56) References Cited

U.S. PATENT DOCUMENTS 11,785,001 B1 * 10/2023 Gogel ................ G06K 7/10722 726/4
11,959,763 B1 * 4/2024 Zorluoglu .......... G01C 21/3407
12,279,021 B2 * 4/2025 Patnaik .............. H04N 21/4333
2015/0269188 A1 * 9/2015 Yang .................. G06K 7/10722 235/375
2019/0065132 A1 * 2/2019 Masui .................... G06Q 30/00
(Continued)

FOREIGN PATENT DOCUMENTS

KR 10-2016-0144618 A 12/2016
KR 102493804 B1 * 1/2023 ....... H04N 21/43079
WO WO-2015048338 A1 * 4/2015 ......... G06Q 30/0251

*Primary Examiner* — Temesghen Ghebretinsae
(74) *Attorney, Agent, or Firm* — Studebaker Brackett PLLC

(57) ABSTRACT

The present disclosure includes a communication unit that performs communication with a plurality of display devices and a user terminal and a processor that controls operation related to provision of video content based on the plurality of display devices. The processor may extract corresponding event result information preset in association with code information of a corresponding recognition code when the code information of the corresponding recognition code arranged to track corresponding video content of the plurality of display devices is received from the user terminal through the communication unit, and control the user terminal to display the corresponding event result information through the user terminal that has scanned the corresponding recognition code.

10 Claims, 13 Drawing Sheets

(56) References Cited

U.S. PATENT DOCUMENTS

| | | | | |
|---|---|---|---|---|
| 2021/0021901 | A1* | 1/2021 | Gupta | G06K 19/06037 |
| 2021/0124542 | A1* | 4/2021 | Yin | G09G 5/006 |
| 2022/0201369 | A1* | 6/2022 | Mcclendon | H04N 21/4312 |
| 2024/0373086 | A1* | 11/2024 | Ross | H04H 60/80 |

* cited by examiner

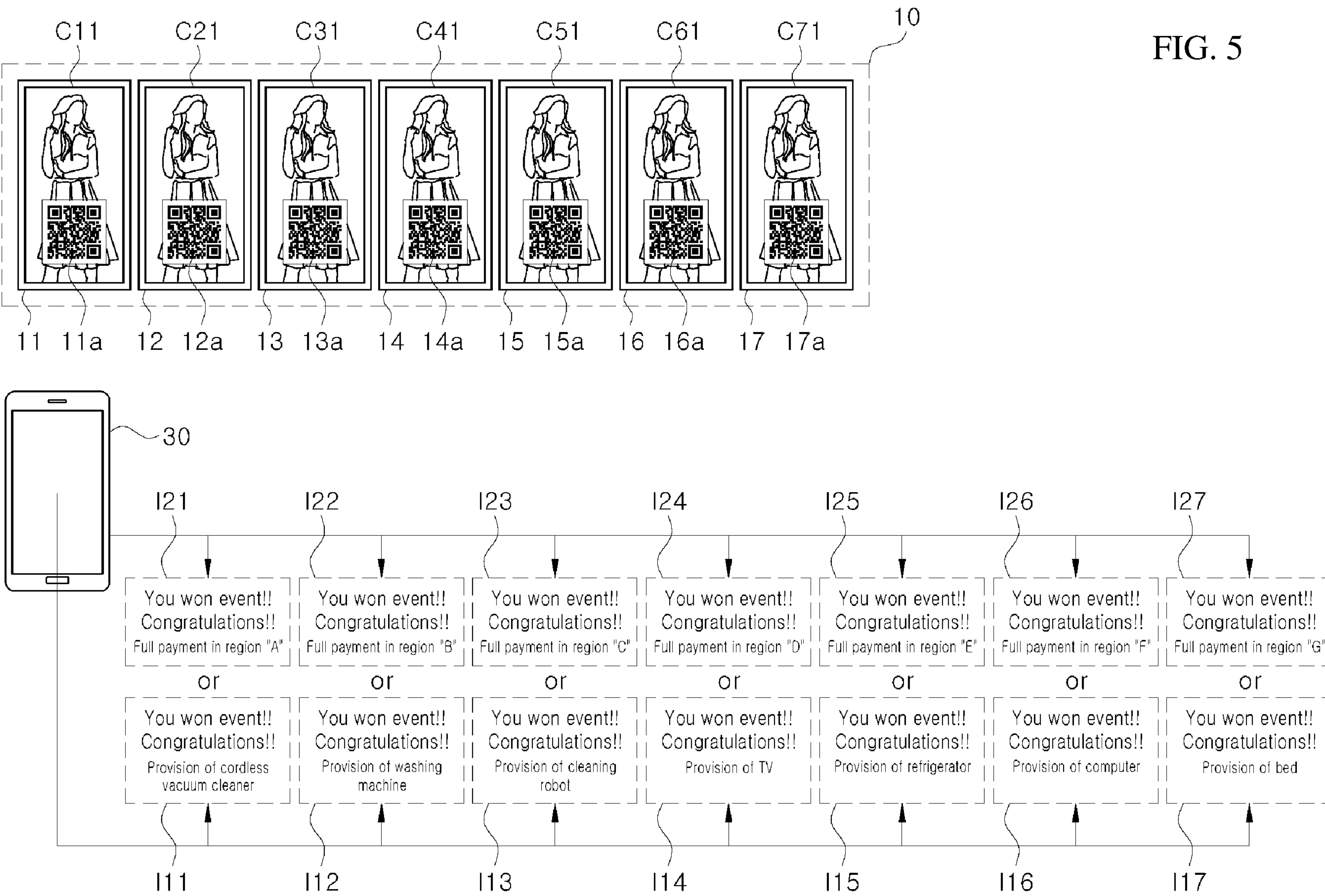
FIG. 5
10
C11
C21
C31
C41
C51
C61
C71
11
11a
12
12a
13
13a
14
14a
15
15a
16
16a
17
17a
30
I21
I22
I23
I24
I25
I26
I27
You won event!! Congratulations!! Full payment in region "A"
You won event!! Congratulations!! Full payment in region "B"
You won event!! Congratulations!! Full payment in region "C"
You won event!! Congratulations!! Full payment in region "D"
You won event!! Congratulations!! Full payment in region "E"
You won event!! Congratulations!! Full payment in region "F"
You won event!! Congratulations!! Full payment in region "G"
or
You won event!! Congratulations!! Provision of cordless vacuum cleaner
You won event!! Congratulations!! Provision of washing machine
You won event!! Congratulations!! Provision of cleaning robot
You won event!! Congratulations!! Provision of TV
You won event!! Congratulations!! Provision of refrigerator
You won event!! Congratulations!! Provision of computer
You won event!! Congratulations!! Provision of bed
I11
I12
I13
I14
I15
I16
I17

METHOD AND SERVER FOR OUTPUTTING RECOGNITION CODE-BASED DIGITAL IMAGE CONTENT TO PLURALITY OF DISPLAY DEVICES

CROSS-REFERENCE TO RELATED APPLICATIONS

A claim for priority under 35 U.S.C. § 119 is made to Korean Patent Application No. 10-2023-0047322 filed on Apr. 11, 2023 in the Korean Intellectual Property Office, the entire contents of which are hereby incorporated by reference.

BACKGROUND

The present disclosure relates to a method and a server for outputting video content to a plurality of display devices. More specifically, the present disclosure relates to a method and a server for outputting recognition code-based digital video content to a plurality of display devices.

In general, promoters produce and promote video content as a means of advertising information for promoting products, lifestyle information, facility information, and the like.

The promoters inform people in the vicinity of video content to appeal products, lifestyle information, facility information, or the like by using display devices.

However, in the past, the notification method of video content using display devices was only provided by displaying it to the surrounding people unilaterally, which could not display the video content efficiently, so it was limited in attracting the attention of the surrounding people.

SUMMARY

The purpose of the embodiments disclosed in the present disclosure is to efficiently display video content using a plurality of display devices and a user terminal to attract the attention of people in the vicinity.

In addition, the purpose of the embodiments disclosed in the present disclosure is to display event result information using a plurality of display devices and a user terminal to attract more attention of people in the vicinity.

The problems to be solved by the present disclosure are not limited to the problems mentioned above, and other problems not mentioned may be clearly understood by those skilled in the art from the description below.

According to an embodiment, a server, which output recognition code-based digital video content to a plurality of display devices, includes a communication unit that performs communication with a plurality of display devices and a user terminal, and a processor that controls operation related to provision of video content based on the plurality of display devices. The processor may extract corresponding event result information preset in association with code information of a corresponding recognition code when the code information of the corresponding recognition code arranged to track corresponding video content of the plurality of display devices is received from the user terminal through the communication unit, and control the user terminal to display the corresponding event result information through the user terminal that has scanned the corresponding recognition code.

The processor may further control the plurality of display devices to further display the corresponding event result information through the plurality of display devices.

The processor may simultaneously control the plurality of display devices to synchronize the corresponding event result information through the plurality of display devices.

The processor may control a corresponding display device to display the corresponding event result information through the corresponding display device in which the corresponding recognition code has been scanned among the plurality of display devices.

The processor may control a corresponding display device and surrounding display devices of a corresponding group preset in association with the corresponding display device to display the corresponding event result information through the corresponding display device in which the corresponding recognition code has been scanned and the surrounding display devices.

The processor may control one display device and a plurality of user terminals to simultaneously participate in the participation of the plurality of user terminals that have scanned the corresponding recognition code provided in one of the plurality of display devices.

The processor may control one display device and a terminal of a corresponding user who has scanned a corresponding recognition code provided on one display device of the plurality of display devices such that control of the one display device is transferred to the terminal of the corresponding user.

According to an embodiment, a method for outputting recognition code-based digital video content to a plurality of display devices, the method being performed by a server, includes receiving code information of a corresponding recognition code arranged to track corresponding video content of the plurality of display devices from a user terminal, extracting corresponding event result information preset in association with code information of the corresponding recognition code, and controlling the user terminal to display the corresponding event result information through the user terminal that has scanned the corresponding recognition code.

The controlling may include further controlling the plurality of display devices to further display the corresponding event result information through the plurality of display devices.

The controlling may include simultaneously controlling the plurality of display devices to synchronize the corresponding event result information through the plurality of display devices.

The controlling may include controlling a corresponding display device to display the corresponding event result information through the corresponding display device in which the corresponding recognition code has been scanned among the plurality of display devices.

The controlling may include controlling a corresponding display device and surrounding display devices of a corresponding group preset in association with the corresponding display device to display the corresponding event result information through the corresponding display device in which the corresponding recognition code has been scanned and the surrounding display devices.

The method may further include controlling one display device and a plurality of user terminals to simultaneously participate in the participation of the plurality of user terminals that have scanned the corresponding recognition code provided in one of the plurality of display devices.

The method may further include controlling one display device and a terminal of a corresponding user who has scanned a corresponding recognition code provided on one display device of the plurality of display devices such that control of the one display device is transferred to the terminal of the corresponding user.

Further, a computer program stored in a computer-readable recording medium for execution to implement the present disclosure may be further provided.

Further, a computer-readable recording medium recording a computer program for executing a method for implementing the present disclosure may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 3 to 13 are diagrams illustrating example processes for outputting recognition code-based digital image content to a user terminal and a plurality of display devices according to the present disclosure.

DETAILED DESCRIPTION

Figure 1:
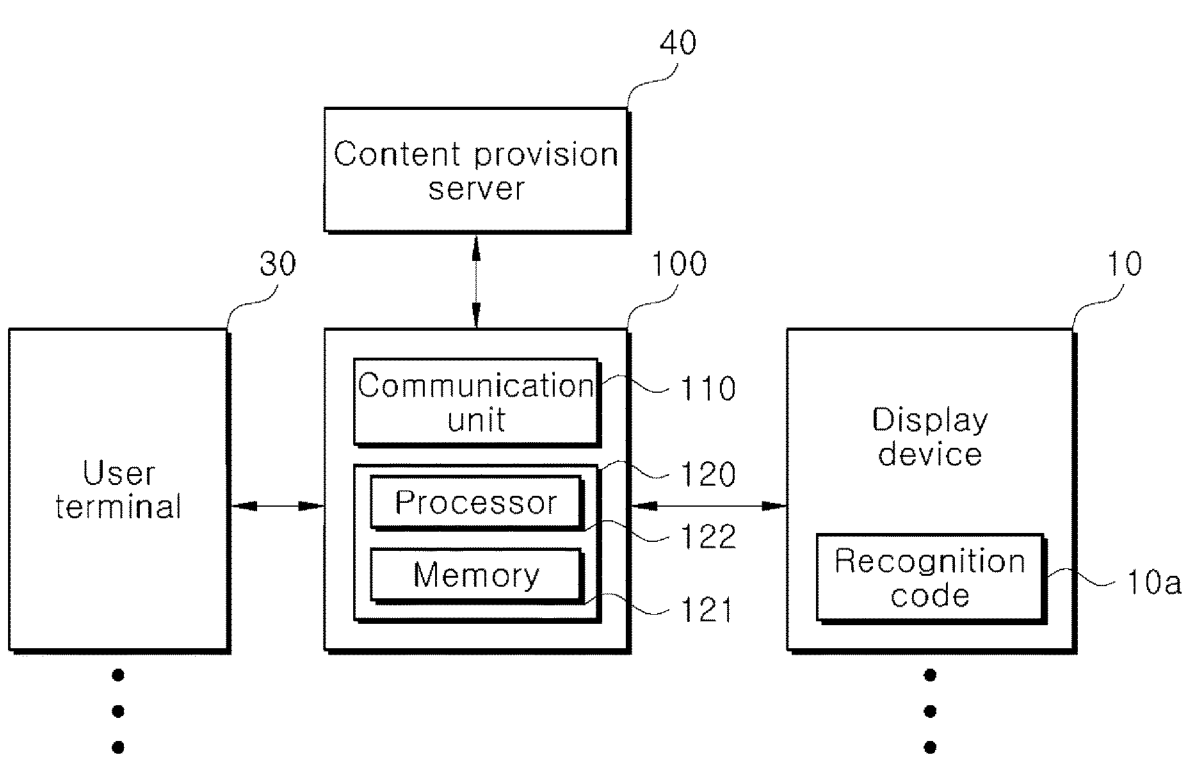
FIG. 1 is a diagram illustrating a configuration of a server according to the present disclosure.

In the following description, like reference numerals refer to like elements throughout the specification. Well-known functions or constructions are not described in detail since they would obscure the one or more exemplar embodiments with unnecessary detail. Terms such as “unit”, “module”, “member”, and “block” may be embodied as hardware or software. According to embodiments, a plurality of “unit”, “module”, “member”, and “block” may be implemented as a single component or a single “unit”, “module”, “member”, and “block” may include a plurality of components.

It will be understood that when an element is referred to as being “connected” to another element, it can be directly or indirectly connected to the other element, wherein the indirect connection includes “connection via a wireless communication network”.

Also, when a part “includes” or “comprises” an element, unless there is a particular description contrary thereto, the part may further include other elements, not excluding the other elements.

Throughout the specification, when a part is referred to as being “connected” to another part, it is understood that it includes not only indirect connection but also direct connection, and the indirect connection includes connection via a wireless communication network.

It will be understood that, although the terms “first,” “second,” etc. may be used herein to describe various elements, these elements should not be limited by these terms.

As used herein, singular forms may include plural forms as well unless the context clearly indicates otherwise.

In each step, identification symbols are used for convenience of description and the identification symbols do not describe the order of the steps and the steps may be performed in a different order from the described order unless the context clearly indicates a specific order.

Hereinafter, the operating principle and embodiments of the present disclosure will be described with reference to the attached drawings.

The present disclosure includes a communication unit that performs communication with a plurality of display devices and a user terminal and a processor that controls operation related to provision of video content based on the plurality of display devices. The processor may extract corresponding event result information preset in association with code information of the corresponding recognition code when the code information of the corresponding recognition code arranged to track corresponding video content of the plurality of display devices is received from the user terminal through the communication unit, and control the user terminal to display the corresponding event result information through the user terminal that has scanned the corresponding recognition code.

The present disclosure may efficiently display video content using a plurality of display devices and a user terminal to attract the attention of people in the vicinity. Furthermore, the present disclosure may display event result information using a plurality of display devices and a user terminal to attract more attention from people in the vicinity.

Hereinafter, the server of the present disclosure will be described in detail.

Figure 2:
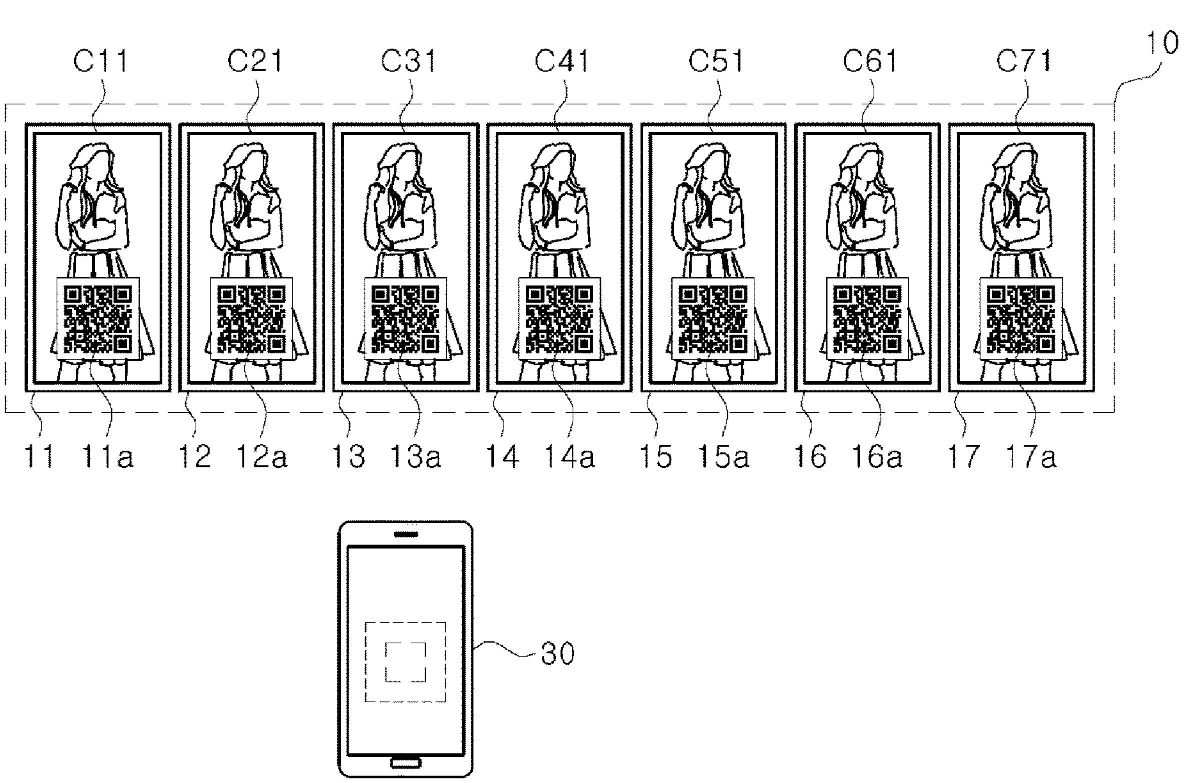
FIG. 2 is a diagram illustrating an example process of scanning a recognition code using a user terminal in FIG. 1.

FIG. 1 is a diagram illustrating a configuration of a server according to the present disclosure. FIG. 2 is a diagram illustrating an example process of scanning a recognition code using a user terminal in FIG. 1.

Referring to FIGS. 1 and 2, a server 100 may include a communication unit 110 and a control unit 120.

The communication unit 110 may be electrically connected to the control unit 120 and may be in communication with a plurality of display devices 10 and a user terminal 30. The communication unit 110 may receive recognized code information from the user terminal 30. In this case, the code information may be based on a QR code, a barcode, or the like and may be information for viewing video content displayed on the plurality of display devices 10. Here, the plurality of display devices 10 may include a corresponding recognition code 10*a* arranged to track the corresponding video content. For example, the plurality of display devices 10 may include first to seventh display devices 11 to 17, and the first to seventh display devices 11 to 17 may include first to seventh recognition codes 11*a* to 17*a* arranged to track first to seventh video content C11 to C71. In this case, the first to seventh recognition codes 11*a* to 17*a* may be QR codes, barcodes or the like. Here, a user may scan the first to seventh recognition codes 11*a* to 17*a* using the terminal 30, and a processor 122 may receive code information of the first to seventh recognition codes 11*a* to 17*a*.

Here, the plurality of display devices 10 may be movable, and the plurality of display devices 10 may be stationary. For example, the plurality of display devices 10 may be mounted on the top surface of a vehicle. The present disclosure is not limited thereto, and the plurality of display devices 10 may be mounted on different portions of the vehicle for displaying video content. In this case, the plurality of display devices 10 may receive video content downloaded in advance from an external content provision server 40 and store the video content in a memory. For example, the video content may include an advertisement video for a certain product, an advertisement video for a certain real estate property for sale, an election campaign video of a certain politician, or the like.

The communication unit 110 may include not only a WiFi module and a wireless broadband module, but also wireless communication modules supporting various wireless communication schemes such as global system for mobile communication (GSM), code division multiple access (CDMA), wideband code division multiple access (WCDMA), universal system mobile telecommunications system (UMTS), time division multiple access (TDMA), long term evolution (LTE), 4G, 5G, 6G, etc.

Further, the user terminal 30 may be a portable terminal. For example, the portable terminal may be a wireless communication device that is portable and mobile and may include all types of handheld-type wireless communication devices, such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), or WiBro (Wireless Broadband Internet) terminals, and wearable devices such as watches, rings, bracelets, anklets, necklaces, glasses, contact lenses, or head-mounted-device (HMD), or the like.

The control unit 120 may be implemented with a memory 121 that stores data for an algorithm or program reproducing the algorithm for controlling the operations of components within the host device, and at least one processor 122 that performs the aforementioned operations using the data stored in the memory 121. Here, the memory 121 and the processor 122 may be implemented as separate chips. Alternatively, the memory 121 and the processor 122 may be implemented as a single chip.

The memory 121 may store data supporting various functions of the host device and programs for operation of the control unit, may store input/output data, and may store a number of applications (application programs or applications) running on the host device, and data and instructions for operation of the host device. At least some of these application programs may be downloaded from an external server through wireless communication.

The memory 121 may include at least one type of storage medium among a flash memory type, a hard disk type, a solid state disk type, an Silicon Disk Drive type (SDD) type, a multimedia card micro type, a card type memory (e.g., SD or XD memory), random access memory (RAM), static random access memory (SRAM), read-only memory (ROM), electrically erasable programmable read-only memory (EEPROM) programmable read-only memory (PROM), magnetic memory, magnetic disk, and optical disk. Further, the memory 121 may be a database that is separate from the host device but connected thereto in a wired or wireless manner.

The processor 122 may control operations associated with providing video content based on the plurality of display devices.

When the processor 122 receives code information of the corresponding recognition code 10*a* arranged to track the corresponding video content of the plurality of display devices 10 from the user terminal 30 via the communication unit 110, the processor 122 may extract corresponding event result information preset in association with the code information of the corresponding recognition code 10*a*. Here, the processor 122 may determine that an event has occurred when a landing page URL in the code information is accessed via the user terminal 30. In this case, the corresponding recognition code 10*a* may be any code that is able to be scanned or entered, such as, but not limited to, a QR code or barcode containing the route to the event.

Further, the processor 122 may control the terminal 30 of a corresponding user who scanned the corresponding recognition code 10*a* to display the corresponding event result information via the terminal 30 of the corresponding user. In this case, the corresponding event result information may be result information of the identical event content which is preset in association with the code information of the corresponding recognition code 10*a* or result information of different event content.

The processor 122 may further control the plurality of display devices 10 to further display the corresponding event result information via the plurality of display devices 10. In this case, the processor 122 may simultaneously control the plurality of display devices 10 to display the corresponding event result information via the plurality of display devices 10 in a synchronous manner. Further, the processor 122 may control a corresponding display device of the plurality of display devices 10 to display the corresponding event result information through the corresponding display device in which the corresponding recognition code 10*a* is scanned. Further, the processor 122 may control the corresponding display device and surrounding display devices of a corresponding group, which are preset in association with the corresponding display device to display the corresponding event result information through the corresponding display device of the plurality of display devices 10 in which the corresponding recognition code 10*a* is scanned, and the surrounding display devices.

FIGS. 3 through 13 are diagrams illustrating example processes of outputting recognition code-based digital video content to a user terminal and a plurality of display devices according to the present disclosure.

Figure 3:
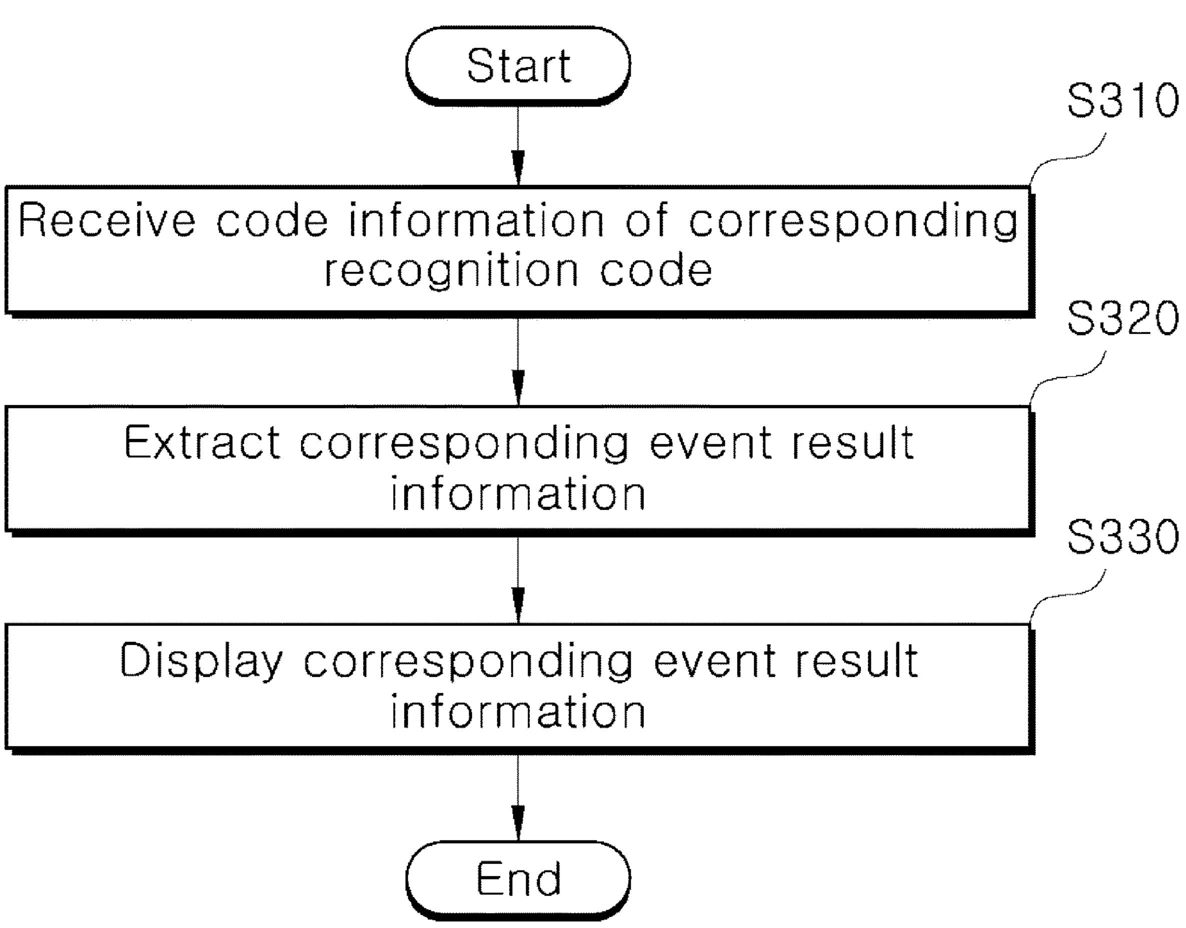

First, referring to FIG. 3, a video content output method may include a receiving operation S310, an extracting operation S320, and a controlling operation S330.

The receiving operation S310 may include receiving, through the communication unit 110, code information of the corresponding recognition code 10*a* arranged to track corresponding video content of the plurality of display devices 10 from the user terminal 30 (S310).

For example, as shown in FIG. 2, a user may scan any one of the first to seventh recognition codes 11*a* to 17*a* using the terminal 30, and the processor 122 may receive code information of any one of the first to seventh recognition codes 11*a* to 17*a*.

In the extracting operation, the processor 122 may extract corresponding event result information preset in association with the code information of the corresponding recognition code 10*a* through the processor 122 when receiving the code information of the corresponding recognition code 10*a* (S320). For example, as shown in FIG. 2, the processor 122 may extract the corresponding event result information preset in association with the code information of the first to seventh recognition codes 11*a* to 17*a*. Here, the corresponding event result information may be result information of the identical event content preset in association with the code information of the first to seventh recognition codes 11*a* to 17*a*, or may be result information of different event content preset in association with the code information of the first to seventh recognition codes 11*a* to 17*a*. In this case, the result information of the identical event content may be event winning result information based on a random selection method for one identical product or one identical real estate property corresponding to a case where the code information of the first to seventh recognition codes 11*a* to 17*a* are identical to each other. Furthermore, the result information of different event contents may be event winning result information based on a random selection method for seven different products or seven different real estate properties corresponding to a case where the code information of the first to seventh recognition codes 11*a* to 17*a* are different from each other. For example, the event winning result information for a product may be the result information of provision of a discount voucher for the product, or the result information of provision of a free-ticket coupon for the product. In another example, the event winning result information for a real estate property may be the result information of the full payment of a deposit for the real estate property.

The controlling operation may include controlling, through the processor 122, the terminal 30 of a corresponding user who has scanned the corresponding recognition code 10*a* to display the corresponding event result information on the terminal 30 of the corresponding user (S330). In this case, the processor 122 may control the terminal 30 of a corresponding user who scanned any one of the first to seventh recognition codes 11*a* to 17*a* to display the corresponding event result information via the terminal 30 of the corresponding user.

Figure 4:
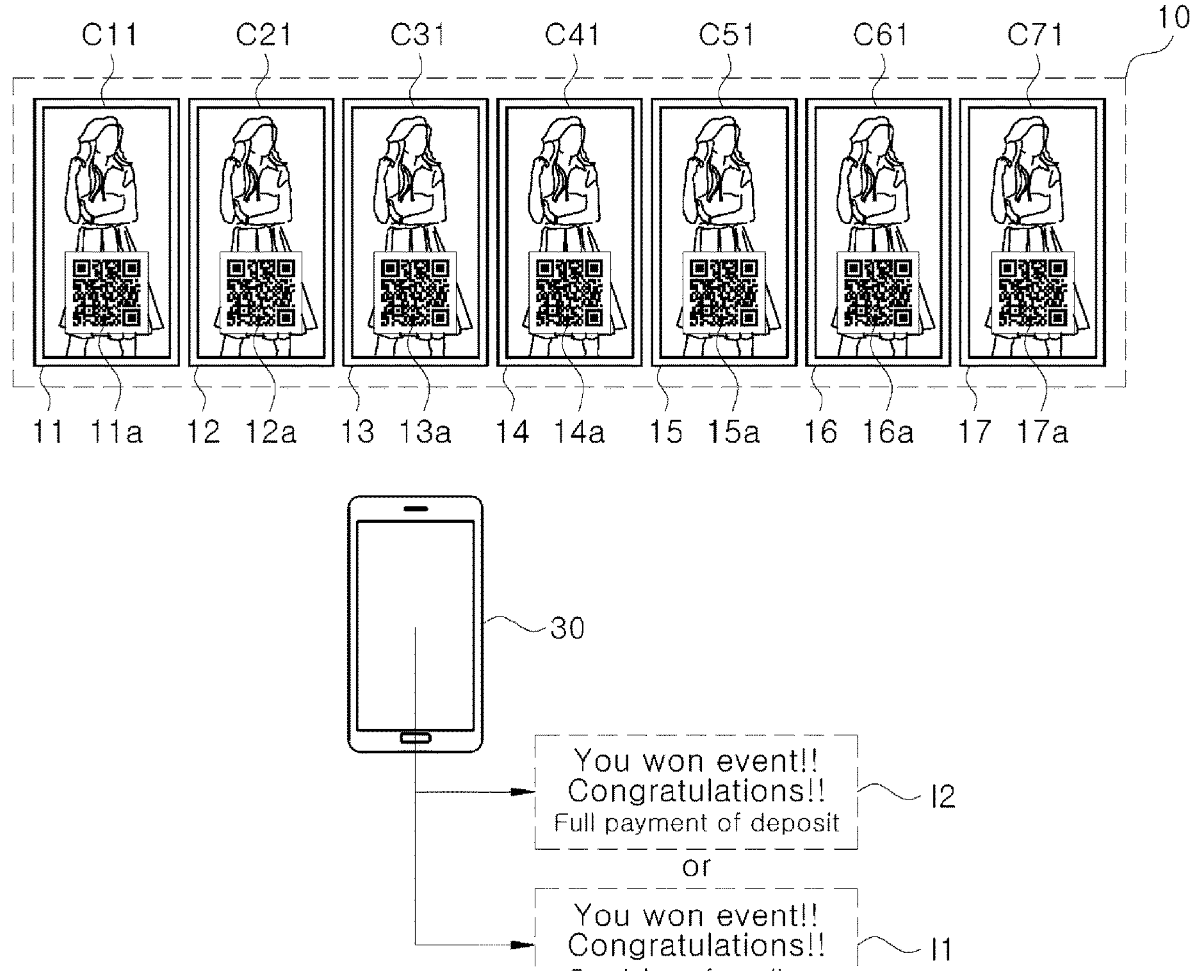

For example, as shown in FIG. 4, the terminal 30 of the corresponding user may display event winning result information I1 and I2 for a single identical product or a single identical real estate property if the pieces of code information of the first to seventh recognition codes 11*a* to 17*a* are identical to each other. In this case, the terminal 30 of the corresponding user may display the result information of provision of the discount voucher for the product, the result information of provision of the free coupon for the product, or the result information of the full payment of a deposit for the real estate property.

For another example, as shown in FIG. 5, the terminal 30 of the corresponding user may display event winning result information I11 to I17 and I21 to I27 for different identical products or different identical real estate properties if the pieces of code information of the first to seventh recognition codes 11*a* to 17*a* are different from each other. In this case, the terminal 30 of the corresponding user may display the result information of provision of the discount voucher for the product, the result information of provision of the free coupon for the product, or the result information of the full payment of a deposit for the real estate property.

The controlling operation may include further controlling the plurality of display devices 10 through the processor 122 to further display the corresponding event result information through the plurality of display devices 10 (S330).

In this case, the processor 122 may simultaneously control the display devices 11 to 17 to display corresponding event result information through the corresponding display device (one of 11 to 17) in which one of the first to seventh recognition codes has been scanned (one of 11*a* to 17*a*), in a synchronous manner.

Figure 6:
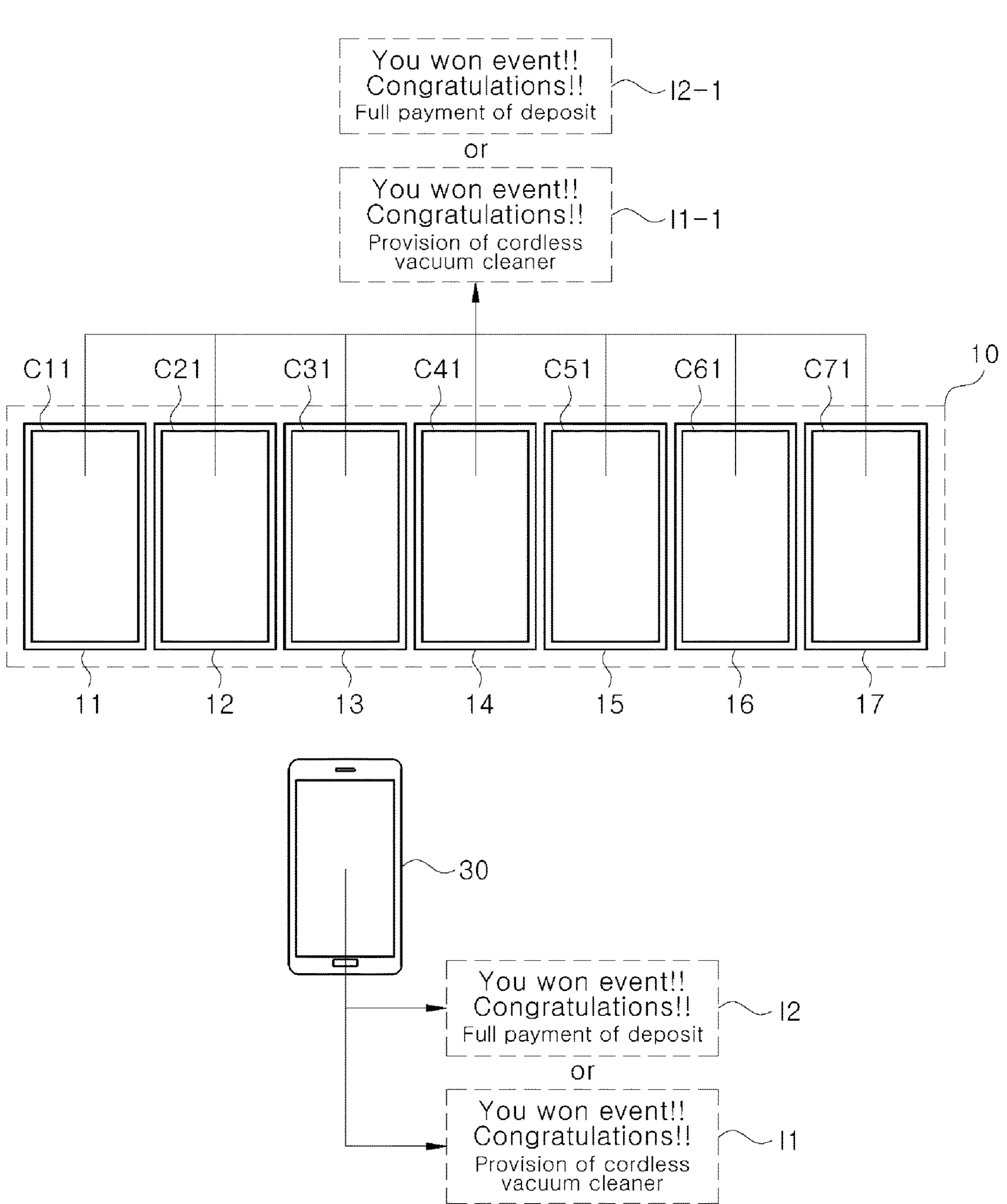

For example, as shown in FIG. 6, the plurality of display devices 11 to 17 may display event winning result information I1-1 and I2-1 for one product or one real estate property corresponding to the third display device 13 in which the third recognition code 13*a* has been scanned, in a synchronous manner.

Figure 7:
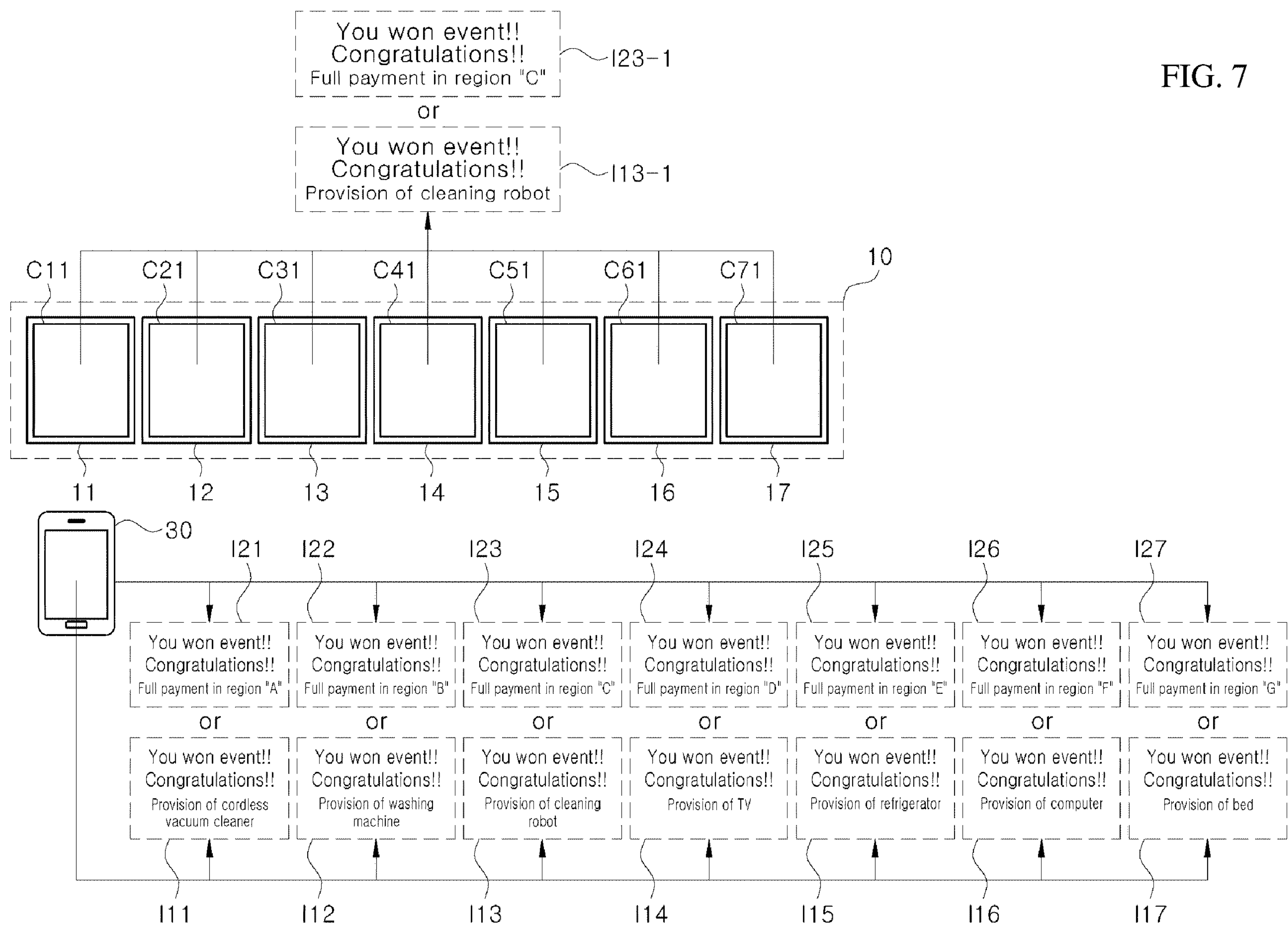

For another example, as shown in FIG. 7, the plurality of display devices 11 to 17 may display event winning result information I1-1 and I2-1 for a third product or a third real estate property corresponding to the third display device 13 in which the third recognition code 13*a* has been scanned, in a synchronous manner. In this case, the plurality of display devices 11 to 17 may display the result information of provision of the discount voucher for the product, the result information of provision of the free coupon for the product, or the result information of the full payment of a deposit for the real estate property.

In addition, the processor 122 may control the corresponding display device (one of 11 to 17) to display corresponding event result information through the corresponding display device (one of 11 to 17) in which one of the first to seventh recognition codes (one of 11*a* to 17*a*) has been scanned.

Figure 8:
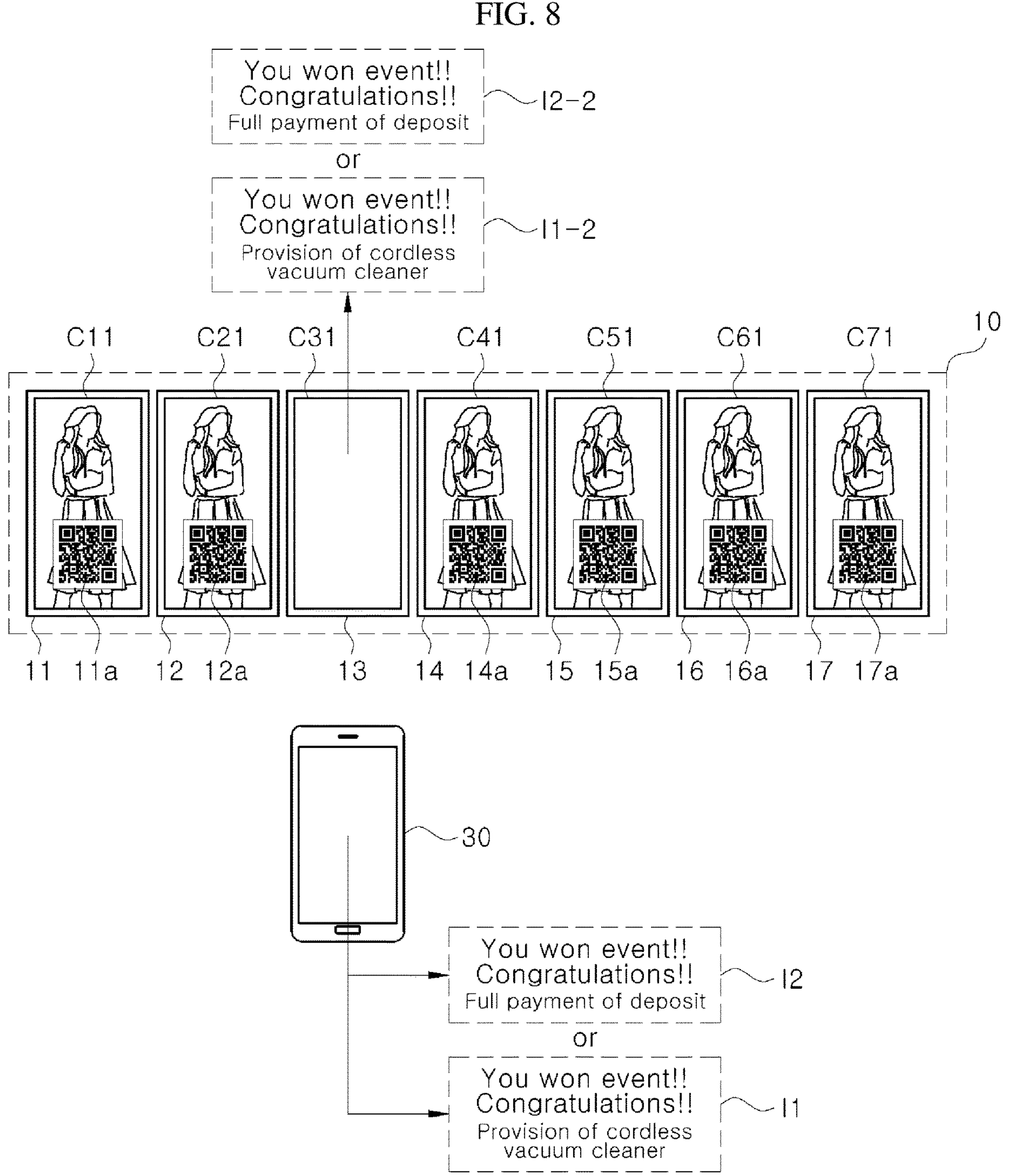

For example, as shown in FIG. 8, the third display device 13 of the corresponding display devices (any one of 11 to 17) may display event winning result information I1-2 and I2-2 for one product or one real estate property corresponding to the third recognition code 13*a*. In this case, the third display device 13 may display the result information of provision of the discount voucher for the product, the result information of provision of the free coupon for the product, or the result information of the full payment of a deposit for the real estate property.

Figure 9:
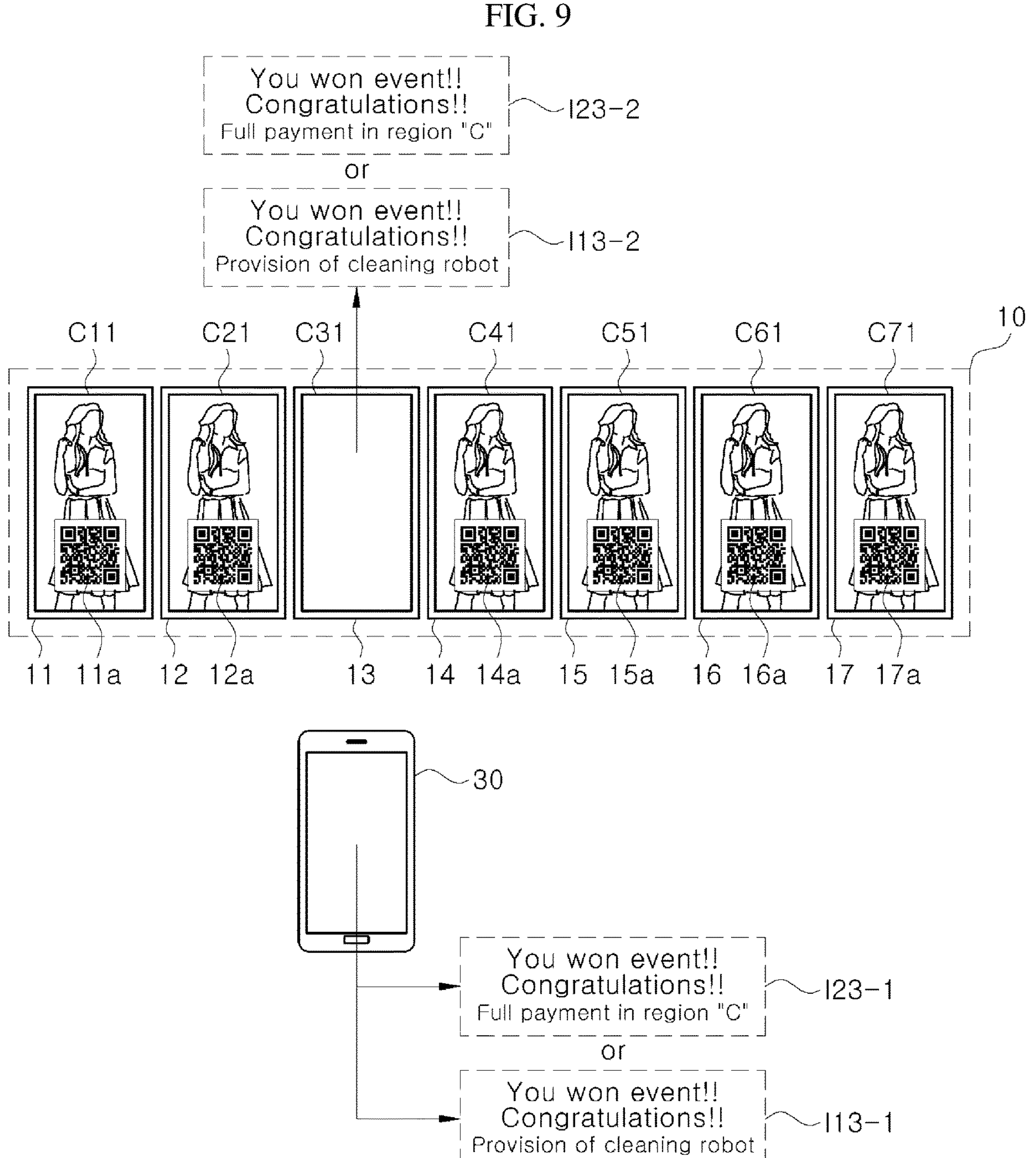

For another example, as shown in FIG. 9, the third display device 13 among the corresponding display devices (any one of 11 to 17) may display event winning result information I13-2 and I23-2 for the third product or third real estate property corresponding to the third recognition code 13*a*. In this case, the third display device 13 may display the result information of provision of the discount voucher for the product, the result information of provision of the free coupon for the product, or the result information of the full payment of a deposit for the real estate property.

In addition, the processor 122 may control the corresponding display device (one of 11 to 17) and a peripheral display device of a corresponding group preset in association with the corresponding display device to display corresponding event result information through the corresponding display device (one of 11*a* to 17*a*) in which one of the first to seventh recognition codes (one of 11*a* to 17*a*) has been scanned and the peripheral display device.

Figure 10:
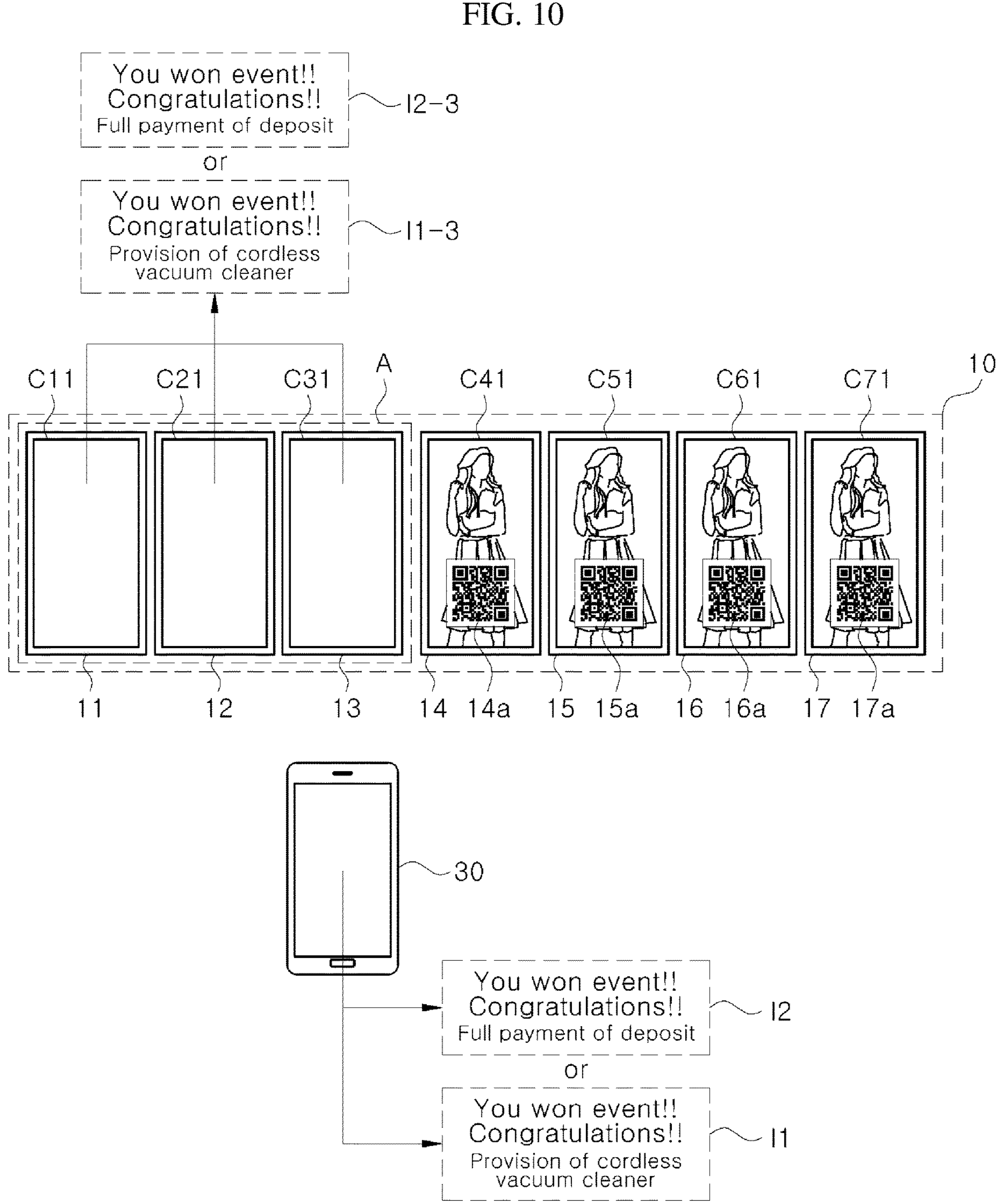

For example, as shown in FIG. 10, the third display device 13 of the corresponding display devices 11 to 17 and the peripheral display devices 11 and 12 of the corresponding group (A) may display event winning result information I1-3 and I2-3 for one product or one real estate property corresponding to the third recognition code 13*a*.

In this case, the first to third display devices 11 to 13 may display the result information of provision of the discount voucher for the product, the result information of provision of the free coupon for the product, or the result information of the full payment of a deposit for the real estate property.

Figure 11:
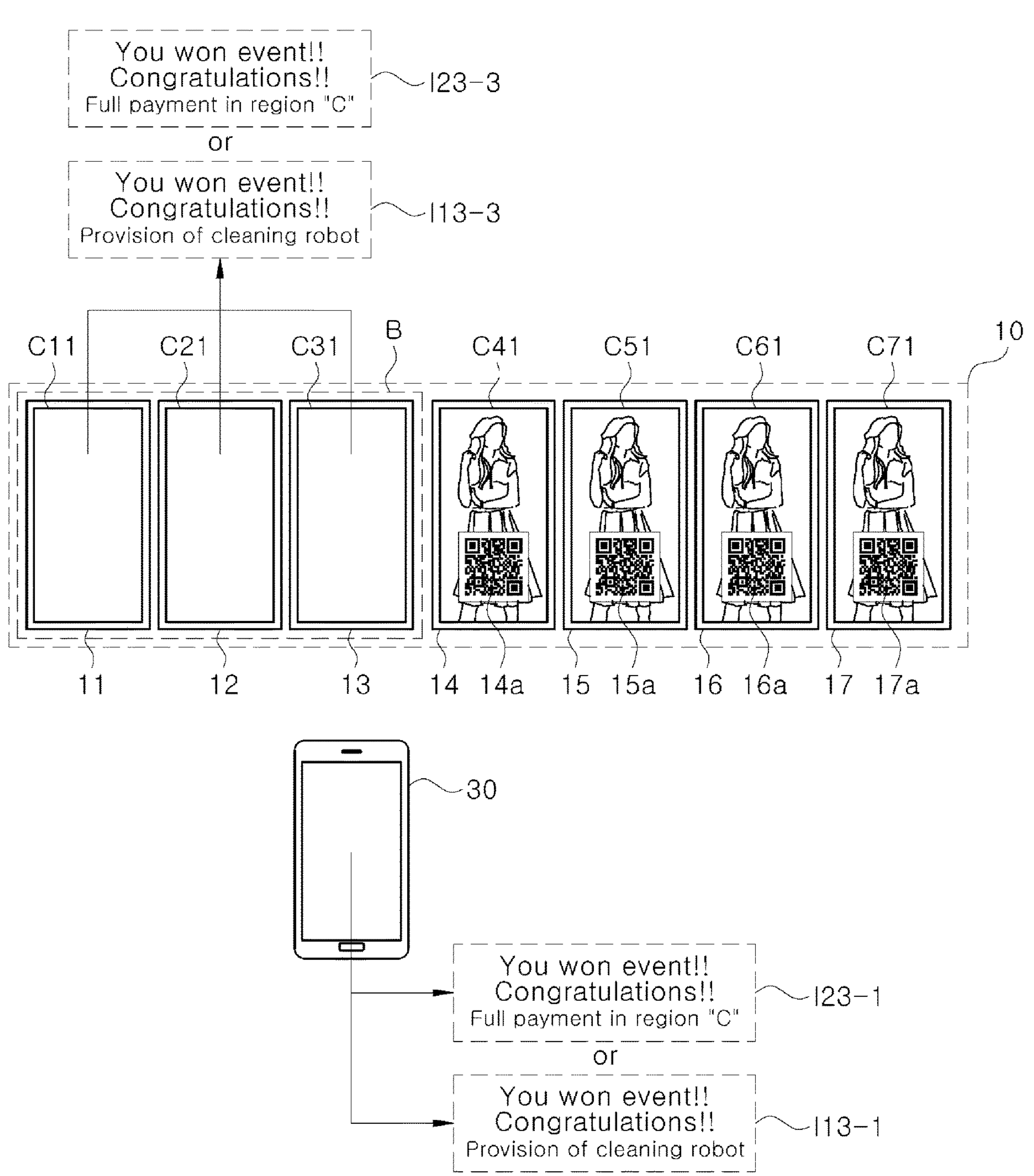

For another example, as shown in FIG. 11, the third display device 13 among the corresponding display devices (any one of 11 to 17) and the peripheral display devices 11 and 12 of the corresponding group (B) may display event winning result information I13-3 and I23-3 for the third product or third real estate property corresponding to the third recognition code 13*a*. In this case, the first to third display devices 11 to 13 may display result information of provision of a discount voucher for a product, result information of provision of a free-coupon for a product, and result information of the full payment of the deposit for the real estate property. Furthermore, the processor 122 may perform control, via the user terminal 30, such that the video content output from the first display device 11 of the plurality of display devices 11 to 17 is output from the second display device 14.

Figure 12:
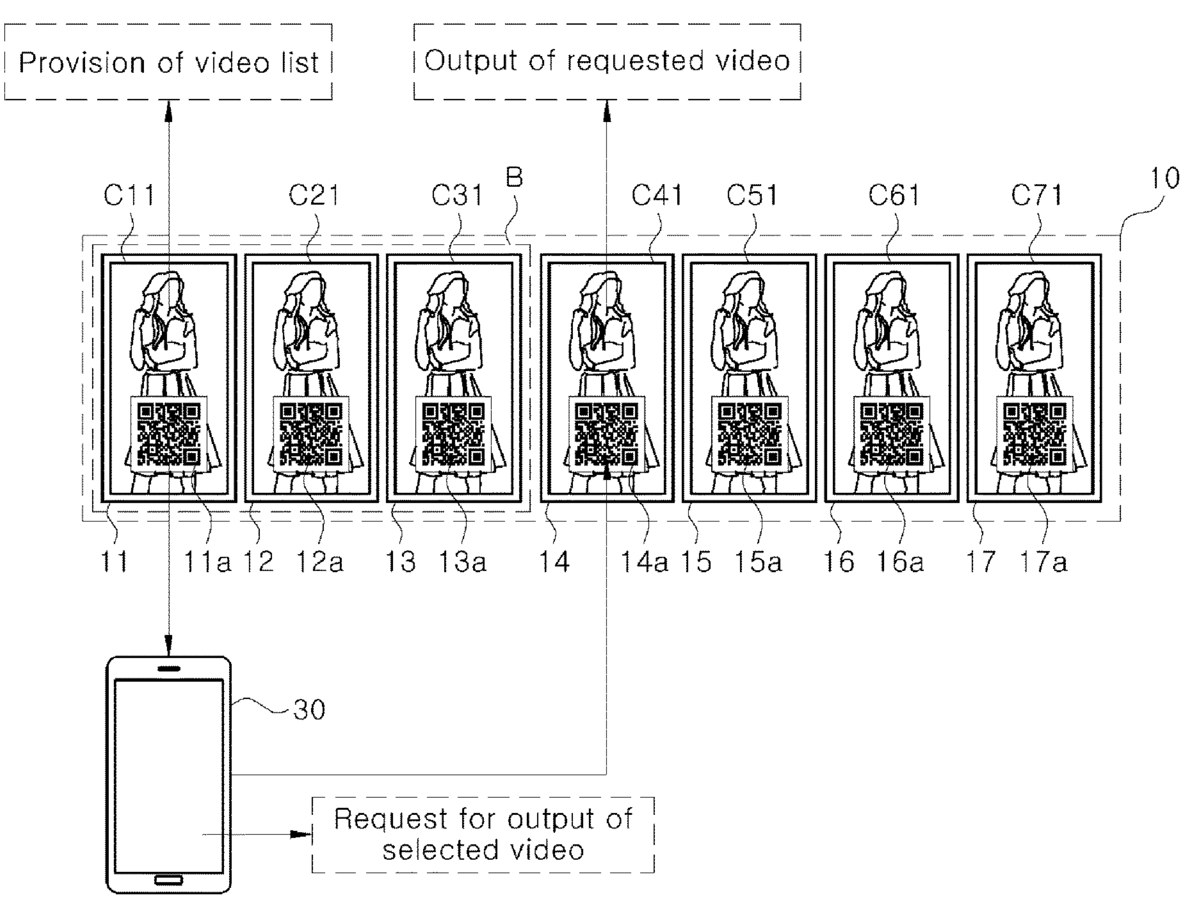

For example, as shown in FIG. 12, the processor 122 may perform control such that the first display device 11 among the plurality of display devices 11 to 17 displays the recognition code 11*a* on the screen and displays a preset or organized image, and, when the code information of the recognition code 11*a* recognized by the user terminal 30 is received from the user terminal 30 via the communication unit 110 while outputting the video content according to the playback order of the preset or organized video playlist, may transmit the video playlist to the user terminal 30 via the communication unit 110 and perform control such that the transmitted video playlist is displayed on the screen of the user terminal 30.

In addition, when at least one video content is selected from the video playlist output on the screen of the user terminal 30 by the user terminal 30 via the communication unit 110, and a signal is received indicating that the second display device 14 of the plurality of display devices 11 to 17 is selected, the processor 122 may perform control such that the at least one video content selected by the user terminal 30 is displayed on the fourth display device 14.

In this case, in the present disclosure, in order to prevent misuse of the image output control of the plurality of display devices 11 to 17 through the user terminal 30, the processor 122 may remove the video playlist and the recognition code 11*a* displayed on the screen of the first display device 11 when the recognition of the user terminal 30 for the recognition code 11*a* of the first display device 11 has been completed. That is, in order to prevent indiscriminate output control of the display device through another person's terminal, the present disclosure may grant control to only one user terminal at a time.

In addition, in the present disclosure, when the output control mode is released while the operation mode of the user terminal is the output control mode of the display device according to FIG. 12, when the communication connection between the user terminal and the content provision server 40 is terminated, when the power of the user terminal is turned off, or when the user terminal is inactive for a preset time, the processor 122 may perform control such that the corresponding recognition code 11*a* is displayed again on the screen of the first display device 11.

In addition, when the validity time of the recognition code is set in the recognition code 11*a*, and the validity time has elapsed from the time the recognition code 11*a* is removed from the screen, the processor 122 may perform control such that the recognition code 11*a* is displayed again on the screen of the first display device 11. In addition, the processor 122 may also output operational content (e.g., a game) that requires operation on a specific display device 14 of the plurality of display devices 11 to 17, and assign the user terminal 30 a role as a remote controller of the operational content.

Figure 13:
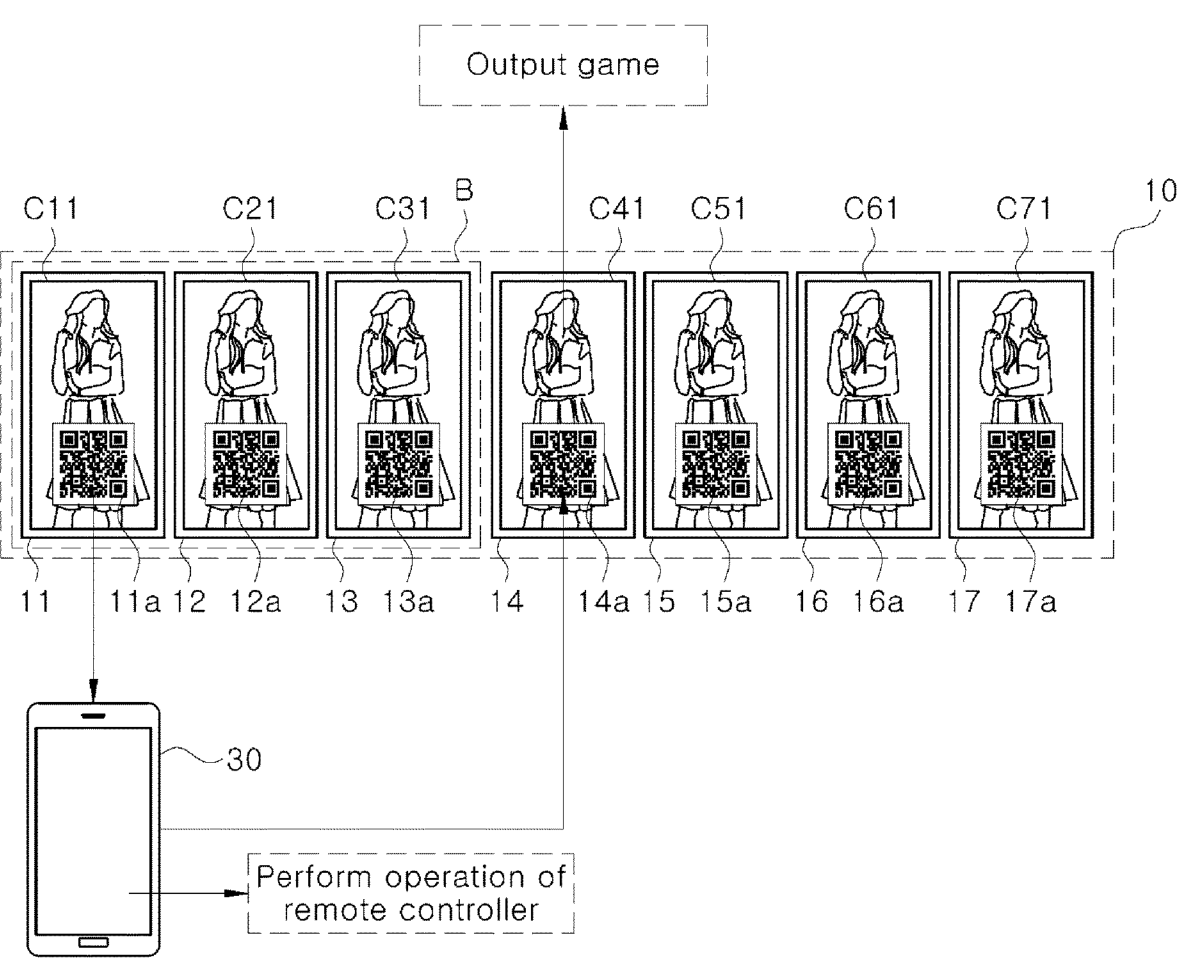

For example, as shown in FIG. 13, when the code information of the recognition code 14*a* recognized by the user terminal 30 is received from the user terminal 30 via the communication unit 110 while the specific display device 14 is displaying the recognition code 14*a* on the screen and is outputting the preset operational content, the processor 122 may transmit a user interface (UI) for controlling the operation of the operational content to the user terminal 30 via the communication unit 110, and perform control that the UI is displayed on the screen of the user terminal 30.

When an operation command inputted via the UI is received from the user terminal 30 through the communication unit 110, the processor 122 may perform control such that the specific display device 14 performs an operation corresponding to the received operation command and outputs operation content reflecting the performed operation.

For example, when the operation content is a game, and the operation command inputted via the UI is a movement command of an object in the game, the processor 122 may perform control such that the specific display device 14 moves the object in the game according to the movement command, and outputs a game screen on which the object has been moved. According to the present disclosure, the plurality of display devices may be equipped with GPS modules based on different recognition codes. In this case, the GPS module may acquire location data of businesses in various industries, such as location data of restaurants, location data of lodgings, location data of hospitals, location data of bakeries, location data of household goods businesses, location data of home appliance businesses, location data of clothing businesses, and the like within preset communication radius. In this case, the user terminal may display the locations of businesses in various industries, such as locations of restaurants, locations of lodgings, location of hospitals, locations of bakeries, locations of household goods businesses, locations of home appliance businesses, locations of clothing businesses, and the like within the communication radius, by scanning different recognition codes.

In the present disclosure, the plurality of display devices may be equipped with an IOT city data collection device based on a different recognition code. In this case, the IOT city data collection device may collect various environmental data such as temperature data by time zone for each region, humidity data by time zone for each region, fine dust data by time zone for each region, carbon dioxide data by time zone for each region, illuminance data by time zone for each region, ultraviolet ray data by time zone for each region, virus-related data by time zone for each region, noise data in daily life by time zone for each region, vibration data in daily life by time zone for each region, traffic noise data by time zone for each region, and traffic vibration data by time zone for each region. In this case, the user terminal may display, by scanning different recognition codes, a temperature by time zone for each region, a humidity by time zone for each region, a fine dust level by time zone for each region, a carbon dioxide level by time zone for each region, an illuminance by time zone for each region, a ultraviolet ray level by time zone for each region, a virus outbreak condition by time zone for each region, a noise level in daily life by time zone for each region, a vibration level in daily life by time zone for each region, a traffic noise level by time zone for each region, a traffic vibration level by time zone for each region, or the like.

The present disclosure may establish two-way communication between a user viewing DOOH (Digital Out of Home) and a DOOH display, using recognition codes that are dynamically transmitted to individual terminals corresponding to a individual content material and the plurality of display devices, thus being provided to be highly versatile.

In the present disclosure, the plurality of display devices may be a plurality of various display media utilized as Public DOOH.

In the present disclosure, a server may transmit and manage videos organized for each DOOH to a single control server, and distribute the videos according to location information of DOOH terminals respectively corresponding to the plurality of display devices. When a separate event and extra tracking are required for each video advertising material, the server may dynamically generate and transmit a recognition code containing an event route with basic unit information (terminal ID or the like) of each DOOH terminal to the each DOOH terminal.

In the present disclosure, when a corresponding display device having a corresponding recognition code is scanned using a camera of a user terminal, another control server may validate the recognition code and generate result to display a result announcement page such as "EVENT WIN!!! Congratulations!!! Full payment of deposit!", and at the same time, convert an image of a corresponding terminal in which corresponding scanning has been performed among the DOOH terminals listening to the other control server into a result announcement video, and display the result on the DOOH device immediately.

Because DOOH terminals respectively controlled by one control server is listening to a different control server, it is possible to group some of a plurality of terminals listening when an event occurs and control the group simultaneously. For example, according to the present disclosure, when a special event of a first prize occurs, one of display devices, in which scanning has been performed, among a corresponding group may display an event result announcement and the other display device may display information including the location of the display device that transmitted the event result announcement, indicating in which region, the first prize has now been won.

The present disclosure may provide QR codes in various forms as the recognition code.

As an example, the present disclosure may utilize a function that allows different content materials to be transmitted to personal terminals, and provides lunch money betting, winning event use, and time deal differential benefits, thereby encouraging QR authentication and creating fun at the same time.

In another example, the present disclosure may use QR codes as a model to utilize the location information of a corresponding digital signage. For example, the present disclosure may use QR codes to provide services such as transportation pick-up and ride (designated driver, taxi call), delivery receipt, ordering, and local (hot restaurant) information/reservation. In this case, the QR code-based service may be provided by entering only an apartment address number, because local area address information is available. In addition, the QR code-based service may be a service associated with a designated driver, a service associated with a taxi app, a service that calls a taxi to the location of a corresponding terminal, a service that exposes a store to a display device based on a QR code, a service that exposes a shelter/media pole to a display device based on a QR code, a service that exposes a map of host restaurants near the signage to a display device based on a QR code, a service that transmits terminal location information to a designated driver, a service provided to inform a list of shops in which reservation/packaging are possible, along with the distance and time required for reservation/packaging to a personal terminal, or a service for allowing a personal terminal to check destinations and perform payment.

The present disclosure may be provided to operate in conjunction with a personal device, and to utilize a digital signage as a personal screen (big screen). For example, the present disclosure may be provided for use with film trailers, M/Vs, YouTube videos, and private events.

The present disclosure may be provided for use in sharing advertisement for a shared display. For example, the present disclosure may be provided to enable an advertisement for a nearby café/dessert shop to be displayed on a display when the QR of a display installed in a restaurant is scanned, and enable a terminal to receive a coupon for the shop.

In the present disclosure, a user who has performed scanning for the first time may set the total amount and number of participants via the settings UI of the display. According to the present disclosure, the display may display a game or the like, and the user who has scanned the display may be provided with the game to enable the user to remotely play the game displayed on the display via a personal terminal.

The present disclosure may control the one display device and the plurality of user terminals to simultaneously perform participation of the terminals of the plurality of users who have scanned a corresponding recognition code provided on the one of the plurality of display devices. In this case, the terminals of the plurality of users may remotely play and enjoy various games via the one display device.

The present disclosure may also control one display device and the terminal of a corresponding user who has scanned a corresponding recognition code provided on one display device of the plurality of display devices such that the terminal of the corresponding user are transferred control of the one display device. In this case, the user terminal may load and enjoy content selected from a variety of content stored on the one display device.

According to the performance of the components illustrated in FIG. 1, at least one component may be added or deleted. Additionally, it will be easily understood by those skilled in the art that the mutual positions of the components may be changed according to the performance or structure of a system.

Although it is described with reference to FIG. 3 that a plurality of steps are sequentially performed, this is merely illustrative of the technical idea of the embodiment. Those of ordinary skill in the art to which this embodiment belongs may perform various modifications and variations such as changing the order described in FIG. 3 or performing one or more of the plurality of steps in parallel without departing from the essential features of the present embodiment, so that the inventive concept is not limited to chronological order in FIG. 3.

On the other hand, the disclosed embodiments may be implemented in the form of a recording medium storing instructions executable by a computer. The instructions may be stored in the form of program codes, which, when executed by the processor, may generate program modules to perform the operations of the disclosed embodiments. The recording medium may be implemented as a computer-readable recording medium.

The computer-readable recording medium includes any type of recording medium on which instructions that can be decoded by a computer are stored. For example, the computer-readable recording medium may include read only memory (ROM), random access memory (RAM), magnetic tape, magnetic disc, flash memory, optical data storage, and the like.

The embodiments of the disclosure have been described above with reference to the accompanying drawings. One of ordinary skill in the art will understand that the disclosure may be practiced in other forms than the disclosed embodiments without altering the technical ideas or essential features of the disclosure. The disclosed embodiments are exemplary and should not be construed as limiting.

According to the above-described means of the present disclosure, it is possible to efficiently display video content using a plurality of display devices and a user terminal, thus attracting the attention of people in the vicinity.

Furthermore, according to the above-described means of the present disclosure, it is possible to display event result information using a plurality of display devices and a user terminal, thus attracting more attention of people in the vicinity.

The effects of the present disclosure are not limited to the effects mentioned above, and other effects not mentioned may be clearly understood by those skilled in the art from the description below.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A server comprising:

a communication unit configured to perform communication with a plurality of display devices and a user terminal; and a processor configured to control operation related to provision of video content based on the plurality of display devices, wherein the processor is configured to:

extract corresponding event result information preset in association with code information of a corresponding recognition code when the code information of the corresponding recognition code arranged to track corresponding video content of the plurality of display devices is received from the user terminal through the communication unit; and control the user terminal to display the corresponding event result information through the user terminal that has scanned the corresponding recognition code, wherein the processor is configured to further control the plurality of display devices to further display the corresponding event result information through the plurality of display devices, and wherein the processor is configured to simultaneously control the plurality of display devices to synchronize the corresponding event result information through the plurality of display devices.

2. The server of claim 1, wherein the processor is configured to control a corresponding display device to display the corresponding event result information through the corresponding display device in which the corresponding recognition code has been scanned among the plurality of display devices.

3. The server of claim 1, wherein the processor is configured to control a corresponding display device and surrounding display devices of a corresponding group preset in association with the corresponding display device to display the corresponding event result information through the corresponding display device in which the corresponding recognition code has been scanned and the surrounding display devices.

4. The server of claim 1, wherein the processor is configured to control one display device and a plurality of user terminals to simultaneously participate in the participation of the plurality of user terminals that have scanned the corresponding recognition code provided in one of the plurality of display devices.

5. The server of claim 1, wherein the processor is configured to control one display device and a terminal of a corresponding user who has scanned a corresponding recognition code provided on one display device of the plurality of display devices such that control of the one display device is transferred to the terminal of the corresponding user.

6. A method for outputting recognition code-based digital video content to a plurality of display devices, the method being performed by a server, the method comprising:

receiving code information of a corresponding recognition code arranged to track corresponding video content of the plurality of display devices from a user terminal;

extracting corresponding event result information preset in association with code information of the corresponding recognition code; and controlling the user terminal to display the corresponding event result information through the user terminal that has scanned the corresponding recognition code, wherein the controlling includes further controlling the plurality of display devices to further display the corresponding event result information through the plurality of display devices, and wherein the controlling includes simultaneously controlling the plurality of display devices to synchronize the corresponding event result information through the plurality of display devices.

7. The method of claim 6, wherein the controlling includes controlling a corresponding display device to display the corresponding event result information through the corresponding display device in which the corresponding recognition code has been scanned among the plurality of display devices.

8. The method of claim 6, wherein the controlling includes controlling a corresponding display device and surrounding display devices of a corresponding group preset in association with the corresponding display device to display the corresponding event result information through the corresponding display device in which the corresponding recognition code has been scanned and the surrounding display devices.

9. The method of claim 6, further comprising:

controlling one display device and a plurality of user terminals to simultaneously participate in the participation of the plurality of user terminals that have scanned the corresponding recognition code provided in one of the plurality of display devices.

10. The method of claim 6, further comprising:

controlling one display device and a terminal of a corresponding user who has scanned a corresponding recognition code provided on one display device of the plurality of display devices such that control of the one display device is transferred to the terminal of the corresponding user.

* * * * *